US012655499B2

(12) United States Patent
Gillespie et al.

(10) Patent No.: US 12,655,499 B2
(45) Date of Patent: Jun. 16, 2026

(54) CONTINUOUS ION EXCHANGE PROCESSES FOR SEPARATING RARE EARTH ELEMENTS

(71) Applicants: Andrew Peter Gillespie, Mulberry, FL (US); Gordon John Rossiter, Lakeland, FL (US)

(72) Inventors: Andrew Peter Gillespie, Mulberry, FL (US); Gordon John Rossiter, Lakeland, FL (US)

( * ) Notice: Subject to any disclaimer, the term of this patent is extended or adjusted under 35 U.S.C. 154(b) by 36 days.

(21) Appl. No.: 18/859,401

(22) PCT Filed: Apr. 12, 2024

(86) PCT No.: PCT/US2024/024301
§ 371 (c)(1),
(2) Date: Oct. 23, 2024

(87) PCT Pub. No.: WO2025/019047
PCT Pub. Date: Jan. 23, 2025

(65) Prior Publication Data
US 2026/0071298 A1 Mar. 12, 2026

Related U.S. Application Data

(60) Provisional application No. 63/526,795, filed on Jul. 14, 2023.

(51) Int. Cl.
*C22B 59/00* (2006.01)
*B01D 15/18* (2006.01)
(Continued)

(52) U.S. Cl.
CPC .......... *C22B 59/00* (2013.01); *B01D 15/1807* (2013.01); *B01D 15/1871* (2013.01);
(Continued)

(58) Field of Classification Search
CPC ........... C22B 59/00; C22B 3/205; C22B 3/24; C22B 3/42; B01D 15/1807;
(Continued)

(56) References Cited

U.S. PATENT DOCUMENTS 4,394,353 A 7/1983 Miyake et al.
4,816,233 A 3/1989 Rourke et al.
(Continued)

FOREIGN PATENT DOCUMENTS

EP 0335538 A2 10/1989
FR 2546499 A1 11/1984
WO WO-2014032095 A1 * 3/2014 ............... C22B 3/44

OTHER PUBLICATIONS

Rossiter, "Ionex Separations—Audubon Sugar Institute Workshop, Innovative CIX Process Configuration" published on May 2007, pp. 42.
(Continued)

*Primary Examiner* — Adil A. Siddiqui

(57) ABSTRACT

The present invention employs continuous ion exchange processes in binary configurations during the refinement of rare earth elements to convert an input stream of mixed rare earth elements into two or more separate streams of isolated rare earth elements. The present invention leverages the different chemical properties and behaviors of heavier and lighter REEs to separate them in continuous ion exchange devices. The present invention applies to any rare earth feed stream in aqueous solution that is relatively pure. Two-phase solid-liquid systems are used herein.

19 Claims, 4 Drawing Sheets

(51) Int. Cl.

| | |
|---|---|
| *B01D 15/20* | (2006.01) |
| *B01D 15/36* | (2006.01) |
| *B01D 15/42* | (2006.01) |
| *B01J 39/05* | (2017.01) |
| *B01J 39/18* | (2017.01) |
| *B01J 39/26* | (2006.01) |
| *B01J 47/02* | (2017.01) |
| *B01J 49/53* | (2017.01) |
| *C22B 3/20* | (2006.01) |
| *C22B 3/24* | (2006.01) |
| *C22B 3/42* | (2006.01) |

(52) U.S. Cl.
CPC ......... *B01D 15/203* (2013.01); *B01D 15/362* (2013.01); *B01D 15/426* (2013.01); *B01J 39/05* (2017.01); *B01J 39/18* (2013.01); *B01J 39/26* (2013.01); *B01J 47/02* (2013.01); *B01J 49/53* (2017.01); *C22B 3/205* (2013.01); *C22B 3/24* (2013.01); *C22B 3/42* (2013.01)

(58) Field of Classification Search
CPC .............. B01D 15/1871; B01D 15/203; B01D 15/362; B01D 15/426; B01J 39/05; B01J 39/18; B01J 39/26; B01J 47/02; B01J 49/53
See application file for complete search history.

(56) References Cited

U.S. PATENT DOCUMENTS

| | | | |
|---|---|---|---|
| 5,676,826 A | 10/1997 | Rossiter et al. |
| 6,093,376 A | 7/2000 | Moore |
| 7,594,951 B2 | 9/2009 | Rossiter |
| 8,293,115 B2 | 10/2012 | Rossiter |
| 9,869,005 B2 | 1/2018 | Berry et al. |
| 2020/0080169 A1 | 3/2020 | Nockemann et al. |
| 2021/0172042 A1* | 6/2021 | Sutterlin ................. C22B 59/00 |
| 2023/0227942 A1 | 7/2023 | Sisson et al. |

OTHER PUBLICATIONS

Baldwin et al., "Outer-Sphere Water Clusters Tune the Lanthanide Selectivity of Diglycolamides" published on Jun. 14, 2018, pp. 9.

Choppin et al., "Complexes of the Lanthanide Elements With a-Hydroxy Carboxylate Ligands", received on Mar. 17, 1961, pp. 17.

Ellis et al., "Straining to Separate the Rare Earths: How the Lanthanide Contraction Impacts Chelation by Diglycolamide Ligands", published on Sep. 8, 2016, pp. 9.

Kumari et al., "Extraction of rare earth metals by organometallic complexation using PC88A", received on Jun. 23, 2018, pp. 6.

Horwitz et al., "Novel Extraction of Chromatographic Resins Based on Tetraalkyldiglycolamides: Characterization and Potential Applications", received on Sep. 21, 2004, pp. 28.

Andreiadis et al., "Rare Earth Recovery and Separation Using Diglycolamides", available on May 23, 2019, pp. 23.

Rossiter, "Continuous Adsorption & Chromatography in the Purification of Fermentation products", pp. 109, (1991).

Rossiter, "Continuous Processing using Solid Absorption", available on Sep. 17, 2009, pp. 17.

Rossiter, "Continuous Ion Exchange (CIX) for Efficient Extraction of Uranium from Leach Liquors", available in 2010, pp. 9.

Rossiter at al., "Continuous Ion Exchange in Hydrometallurgy", available in 2012, pp. 10.

Rossiter, "Process development testing for continuous ion exchange applications", pp. 11. (2009).

Rossiter at al., "Copper recovery from leach liquors using continuous ion exchange", Randol Conference 1998, pp. 10.

* cited by examiner

CONTINUOUS ION EXCHANGE PROCESSES FOR SEPARATING RARE EARTH ELEMENTS

CROSS-REFERENCE TO RELATED APPLICATIONS

The present application claims the benefit of, and priority to, U.S. Provisional Patent Application No. 63/526,795, filed Jul. 14, 2023.

FIELD OF THE INVENTION

The present invention relates to refining rare earth metals and like materials from aqueous salt solutions. More specifically, the present invention relates to separating rare earth metals in solution into pure streams of individual or smaller groups of rare earth elements employing continuous ion exchange.

BACKGROUND OF THE INVENTION

Rare earth elements (REEs), also called rare earth metals, are a set of elements in the periodic table of elements. The REEs, or lanthanides, comprise the 15 metals with atomic numbers 57-71. Along with scandium and yttrium (atomic numbers 21 and 39, respectively), they are often collectively known as the "rare earth elements." Compounds containing REEs have varied applications, including electrical and electronic components, lasers and lenses, magnetic materials, and as catalysts in various industrial processes. REEs have particular application to modern green technologies, including wind and solar power facilities and devices, as well as electric vehicles, magnets and batteries. REEs also have particular application to advanced communications technologies, such as mobile phones, computers, and other computerized devices.

REEs are typically geologically dispersed in nature and atypically found in concentrated form. Natural sources of REEs include ionic clays, monazite sands, and hard rock mines. Additional sources of REEs include recycled materials and mine wastes. Much work is usually required to separate and refine REEs. Because of their geochemical properties, REEs present in almost all sources will require substantial processing to isolate the REEs from non-REE impurities, and substantial further processing to separate various REEs from one another. The purification process involves removing all or most of the non-REE elements that otherwise interfere with the refining process. The subsequent refining process comprises separating the individual REEs into separate streams of high purity; each stream then being separately processed to produce a saleable product. The term "refining" refers collectively to processes used to separate individual REEs from their neighbors in the periodic table, and "refinery" is the term used to refer to the plant and equipment designed to separate and recover the individual REEs as solid products, namely, rare earth oxides or carbonates or other solid forms.

Given their properties, REEs are challenging to separate chemically. Early work on refining REEs focused on using conventional ion exchange (IX) processes. In general, IX involves a reversible interchange of one kind of ion present in an insoluble solid with another of like charge present in a solution surrounding the solid, with the reaction being used especially in the purification and separation of chemicals and substances. IX usually involves a process of treatment of aqueous solutions using beds of solid polymeric ion-exchange resin placed in closed vessels through which fluids are passed.

The fundamental principle for separating the REEs using IX was developed in the 1940s, 1950s and 1960s. Much literature is available from researchers at the Ames Laboratory (Ames, Iowa USA) facility and various other researchers in industry, including Rhone Poulenc in France, looking into using ion exchange to produce REEs.

If one considers a column of cation resin loaded with REEs, eluting the column with a mineral acid eluent shows essentially no selectivity due to the similarity in chemical affinity of the REEs for the eluent.

Alternatively, if the eluent is the salt of an organic acid, the anion of which chelates with lanthanides to form an anionic complex in solution, then the differences between the formation constants causes the lanthanides to elute from the column as a function of their formation constants. The use of the above mentioned organic anionic complexing agents is well known from previous investigators. The reader is referred to, for example, the work G. R. Choppin and J. A. Chopoorian, *Complexes of the Lanthanide Elements with α-Hydroxy Carboxylate Ligands*, J. INORG. NUCL. CHEM., Vol. 22, pp. 97-113 (1961), for more information. Each complexing agent typically differs from the others with slightly different order of elution. The order of elution refers to the order in which REEs elute from a resin column, which reflects the strength of the REE-anion complex. In general, REE-anionic complexes increase in strength as a function of the REE atomic number. Yttrium and Scandium change their position in the elution order depending on the anion forming the complex. The REEs are commonly divided into two groups, "light" and "heavy," and sometimes divided into three groups, "light," "middle," and "heavy." Differences in the groups are related to their chemical behavior which consequently affects their use. The heavier REEs are required for multiple critical applications and are less abundant than the lighter REEs.

While advances in IX procedures during this early timeframe facilitated some industrial use of REEs, the industrial production at scale of REEs via IX procedures suffered from many deficiencies. For instance, the resins required were placed in large columns connected in series, requiring substantial plant space. These early IX processes also required long processing times for the REEs and were otherwise inefficient in the use of chemicals and water. The separations process was laborious and made inefficient use of resins. In short, the drawbacks to using conventional ion exchange are several: the processing times were exceedingly long, required non-continuous processing schemes, and were economically inefficient in the use of resin/sorbent capacity.

Since those early days, the industry for refining REEs has gravitated toward using Solvent Extraction (SX) processes instead of IX. In general, SX involves separating metal-based compounds based on their relative solubilities in two different immiscible liquids, usually water and a non-polar, organic solvent. SX, in contrast to IX, is a continuous process. Nevertheless, SX has its drawbacks with respect to the waste streams associated with the organic fluids used in organic liquid phases. These waste streams are widely recognized to be of serious environmental concern and extraordinarily hazardous to human and other life.

SX is well known in the metals industry for extracting and purifying transition metals. The liquid phases are usually: a) an aqueous phase that contains the metals of value, and b) an organic phase that carries the selective extractant in a solvent diluent (typically kerosene). The physical equipment employed in SX is called a mixer settler. Mixer-settler units are operated as a series of counter-current contact stages. The size of the mixer settler system is usually a function of the time required to separate or disengage the two liquid phases. Each mixer-settler is essentially a single equilibrium contact. The two liquid phases enter a mixer from opposite directions in the counter-current scheme. The mixer is a reactor in which mass transfer of the metal species occurs from one phase to the other. The equilibrated mixture then flows into a settler where the two phases separate into an organic stream and an aqueous stream. Exiting the settler, the two streams move on to the next stage (mixer-settler) in opposite directions. In the case of separating REEs into their individual elements, many hundreds of SX stages are required. Since SX plant physical size is a function of the area required for phase disengagement, these plants have grown quite large. The number of mixer settlers to completely resolve all of the individual REEs has been reported to be more than 1,000 in a single industrial operation.

In the last three decades (1990s-2020s), science and industry have uncovered many new applications for using the various REEs. The demand for these applications has, in turn, substantially increased the demand for separated REEs in various finished forms; typically, solid rare earth oxides or REOs. Even so, SX has remained as the separation technology almost exclusively for large-tonnage production notwithstanding its known (negative) environmental and human impacts. As demand for REOs increased and, in parallel as the ecological constraints in the Western world became more stringent, industrial production has gravitated toward China, where rich deposits are known to exist but where certain environmental concerns may receive less consideration from regulators and industrial actors. China has become not only the largest supplier of REOs but also dominates the refining of REE products, in part because of a willingness to overlook the long-term environmental and human impact of SX processes. Manufacturing of products incorporating REEs has consequently become dependent on Chinese suppliers of refined REE products. International issues involving China, however, continually disrupt the global supply chain for such products.

In light of the foregoing, there has been a need in the art for methods of separating REEs at industrial scale that improve on both SX and conventional IX processes. Specifically, processes are needed that are more compact and more efficient than conventional IX processes, but that are continuous like SX processes without producing large amounts of toxic waste.

Developments in equipment technology since the 1980s have brought continuous ion exchange (CIX) systems into operation industrially. CIX systems have successfully replaced fixed-bed ion exchange in many different industrial processes since that time. The benefits of using CIX include higher sorbent utilization, meaning lower capital cost and smaller plant footprint; reduced eluent consumption, meaning lower operating costs; and higher product concentration and purity, meaning lower downstream plant size and treatment cost, and less waste product.

Examples of modern CIX systems include ISEP®/CSEP® (Calgon Carbon Corp., Pittsburgh, Pennsylvania USA), ION-IX (PuriTech, a subsidiary of Sun Resin, Shaanxi China), and RDA (Ionex Separations, Houston Texas USA). These modern CIX systems permit the implementation of more flexible schemes for fluid-solid contacting processes. These advances in fluid solid contacting equipment combined, in combination with new advanced process schemes, provide new and more efficient processing capability for separating materials. However, application of CIX processes to separating REEs has been limited and hampered by the lack of attention, beyond a few small entities, to bringing this new capability into industrial practice. Some examples of new CIX practice are contained in "Continuous Ion Exchange in Hydro-Metallurgy", Hydro-Process 2012, Santiago Chile, G. J. Rossiter & Enrique Roman E.

The present invention overcomes many of the disadvantages of both "old" fixed bed IX and modern continuous Solvent Extraction processes.

BRIEF SUMMARY OF THE INVENTION

The present invention employs continuous ion exchange (CIX) processes in binary configurations during the refinement of rare earth elements (REEs) to convert an input stream of mixed REEs into two or more separate streams of isolated REEs. The present invention leverages the different chemical properties and behaviors of heavier and lighter REEs to separate them in CIX devices. The present invention applies to any rare earth feed stream in aqueous solution that is relatively pure. Two-phase solid-liquid systems are used herein.

The present invention can be thought of as a two-step process. The first step is to pre-process a stream containing mixed REEs to produce one or more pre-processed streams containing mixed REEs suitable for introduction into the second step.

The first step is implemented on one or more CIX devices, and involves performing an initial cation exchange on a stream comprising the lanthanide salt solution of a mineral acid (e.g., nitric, hydrochloric, sulfuric). Employing a CIX system, the first step converts the lanthanides in solution to an ammonium salt solution of lanthanides complexed with a suitable chelating anion. The first step may produce two or more such streams separated by order of elution, i.e., one stream may contain faster eluting REEs while another stream may contain slower eluting REEs. In a preferred embodiment, the adsorption in this first step of the process is performed using a lanthanide nitrate salt solution; the effluent from this first cation exchange process comprises an ammonium nitrate solution that can be processed into a useful liquid fertilizer product. Similarly, the elution section in this first step is fed with the ammonium salt of a chelating organic acid and continuously produces one or more pre-processed chelated lanthanide-containing streams suitable for feeding into the second step.

The pre-processed inputs are provided to the second step, which is accomplished by using one or more binary separators, likewise implemented in CIX process equipment. Binary separation operation consists of a CIX device charged with a suitable cation exchange adsorbent resin and configured to include zones of operation through all of which the resin passes in a cyclic manner. Resin is first acidified using mineral acid solution to prepare the resin to be used in separating REEs within the CIX device. The contact between acid solution and solid resin is conducted in a counter-current fashion. The acidified resin is rinsed with water to wash out entrained acid from the resin. The acidified and rinsed resin then enter a separation zone to produce an extract stream and a raffinate stream. The extract stream includes lighter (slower eluting) REEs, while the raffinate stream includes heavier (faster eluting) REEs. The clean separation occurs due to the relative affinities that each REE has for the complexing anion and the separating power of the cascade within the CIX device. The extract and raffinate streams may be provided to further instances of the same binary separation processing element to generate further extract and raffinate streams and thus further separation of REEs. The binary separation process may be repeated until the resultant REEs streams contain one REE or a smaller grouping of saleable or otherwise segregable REEs. As with the first step, binary separation as described herein continuously produces separated REEs without generating toxic waste, while efficiently recycling the eluent used in the process.

It will be remarked that the process is quite simple and operates such that the REEs enter and exit the separations process in exactly the same form—as complexed anions of an organic acid. By utilizing CIX devices, the process requires a much smaller plant footprint compared to conventional processes. The process is also much more environmentally friendly. No toxic waste is generated. To the contrary, the non-REE effluents from this process, whether liquid, gas, or solid, are either recycled or recyclable. The process is therefore appropriate for use in jurisdictions, such as the United States, where environmental regulation is stricter.

DETAILED DESCRIPTION OF THE INVENTION

Figure 1:
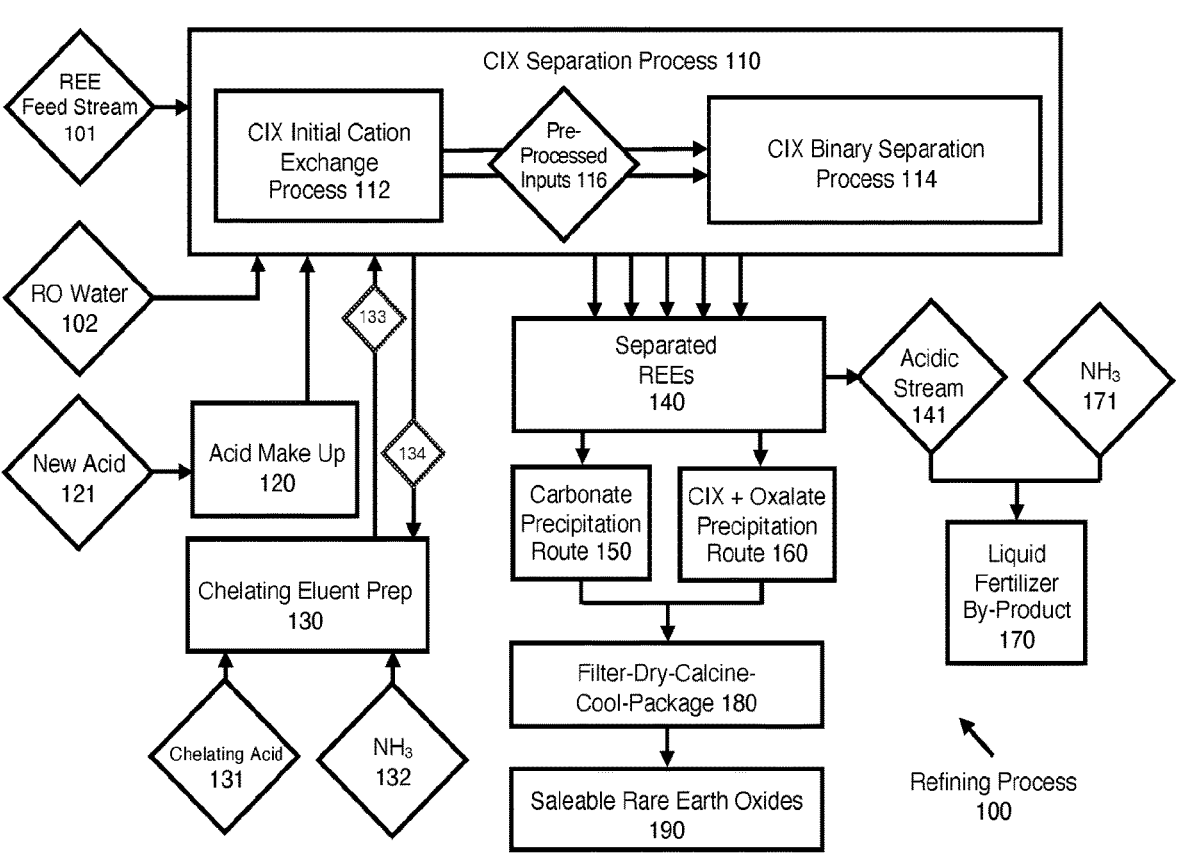
FIG. 1 is a diagram of an embodiment of the novel refining processes disclosed herein.

FIG. 1 depicts an exemplary refining process (100) embodying the present invention. Principally speaking, the refining process (100) receives a feed stream containing mixed REEs (101) and produces multiple streams containing separated REEs (140). The separation of the REE feed stream (101) into multiple streams containing separated REEs (140) is achieved via CIX separation process (110). This is a two-step process. Both steps are performed using one or more CIX devices. The first step is to produce, via a CIX initial cation exchange process (112), one or more pre-processed inputs (116). The second step is to use such pre-processed inputs (116) from the CIX initial cation exchange process (112) to produce, via CIX binary separation process (114), two or more streams of separated REEs (140). The refining process (100) shown in FIG. 1 includes post-separation processing (150, 160, 180) to produce separate, saleable REE products (190).

In FIG. 1, REE feed stream (101), as provided to refining process (100), is generally rich only in REE species accompanied by minor amounts of cationic impurities. The major mass of impurities (non-REEs) are eliminated from REE feed stream (101) prior to refining process (100) via one or more extraction or purification processes (not shown). REEs are generally recovered from raw materials such as ore or recycled scrap. There are many process schemes to extract the REEs from a raw material or recycled scrap. A typical purification route might include mining, crushing, grinding, and/or leaching followed by preconcentration with membrane nano-filters, pH adjustment to remove certain contaminants as precipitates, SX processes, and/or ion exchange treatments to remove non-REE elements. Purification of the solution is accomplished by many different processes to remove impurities that include Fe, Al, Ca, Mg, U, Th, Hf, and Zr and even Co, Ni and Cu. These prior treatments are specific to the composition of the raw material and may vary depending on the origin of the raw materials. After these initial purification steps, the solution will be suitable for entry to the refining process (100) as REE feed stream (101).

Additional inputs to refining process (100) include demineralized (RO) water (102), acid (121), eluent (131), and ammonium (132). Although ammonium (132) is shown in FIG. 1, it is only an example. Alternative embodiments of the present invention may use a lanthanide-sulphate or lanthanide-chloride solution as feed solution (101). Acid (121) is provided to an acid make up process (120), whose output is provided to CIX separation process (110). Eluent (131) and ammonium (132) are provided to a chelating eluent preparation process (130), whose output (134) is likewise provided to CIX separation process (110). The preferred eluent preparation process (130) is to produce an ammonium salt solution, having pH range from 3.5 to 5.5, where the organic acid used is one of, e.g., lactic, glycolic, citric, and other alpha hydroxy carboxylic acids. The preferred eluent concentration ranges from 0.1Molar to 0.6Molar, and the preferred eluent temperature ranges from 15-90° C.

CIX separation process (110) within refining process (100) produces multiple streams of separated REEs (140). The process by which CIX separation process (110) produces such streams is discussed below in connection with FIGS. 2-4. CIX separation process (110) produces separated aqueous salt streams of pure REEs (140), which are treated in either carbonate (150) or oxalate (160) precipitation routes that ultimately produce REEs in saleable forms (190) such as rare earth oxides or rare earth carbonates. Some of separated REEs (140) may be provided to carbonate precipitation process (150), while other of separated REEs (140) may be provided to oxalate precipitation process (160). Alternatively, all separated REEs (140) may be provided to the carbonate precipitation process (150) or the oxalate precipitation process (160). Both routes include filtration and drying process steps and, in the case of the oxalate precipitation route, also includes a calcination process step. Stated otherwise, once the individual REEs (or mixtures thereof) become separated to a high degree of purity, each REE stream then passes through the product recovery steps of precipitation (150, 160), drying, and calcining, and ultimately storage/packaging (180) to produce REEs in saleable form (190), i.e., REE products including one or sometimes two or more REEs depending on the commercial value of partial or complete isolation of an REE. It should be noted that any carbon dioxide ($CO_2$) produced by this process may be captured a scrubber, i.e., a piece of equipment that absorbs carbon dioxide ($CO_2$). Carbon dioxide may result, for example, from the decomposition of the oxalate precipitate. The processes disclosed herein may be implemented in a small enough footprint so as to seal and capture carbon dioxide.

The choice of carbonate or oxalate precipitation routes depends on considerations with respect to the target purities of the finished product among other process options. Precipitation is executed in a cascade of agitated reaction vessels. The oxalate route, or high purity route, is preceded by an ion exchange step in which the Ln (3+) ions are eluted into a nitrate eluent. Oxalic is preferred in this case because it is effective at low pH ($2.0 < pH < 4.0$). The carbonate route by contrast employs a direct precipitation from the separation step. Stated otherwise, the ammonium carbonate/bicarbonate route does not have a CIX pretreatment and the precipitant is added in similar fashion directly to the final extract or raffinate. Exemplary precipitants include oxalic acid, ammonium carbonate, and ammonium bicarbonate.

Figure 2:
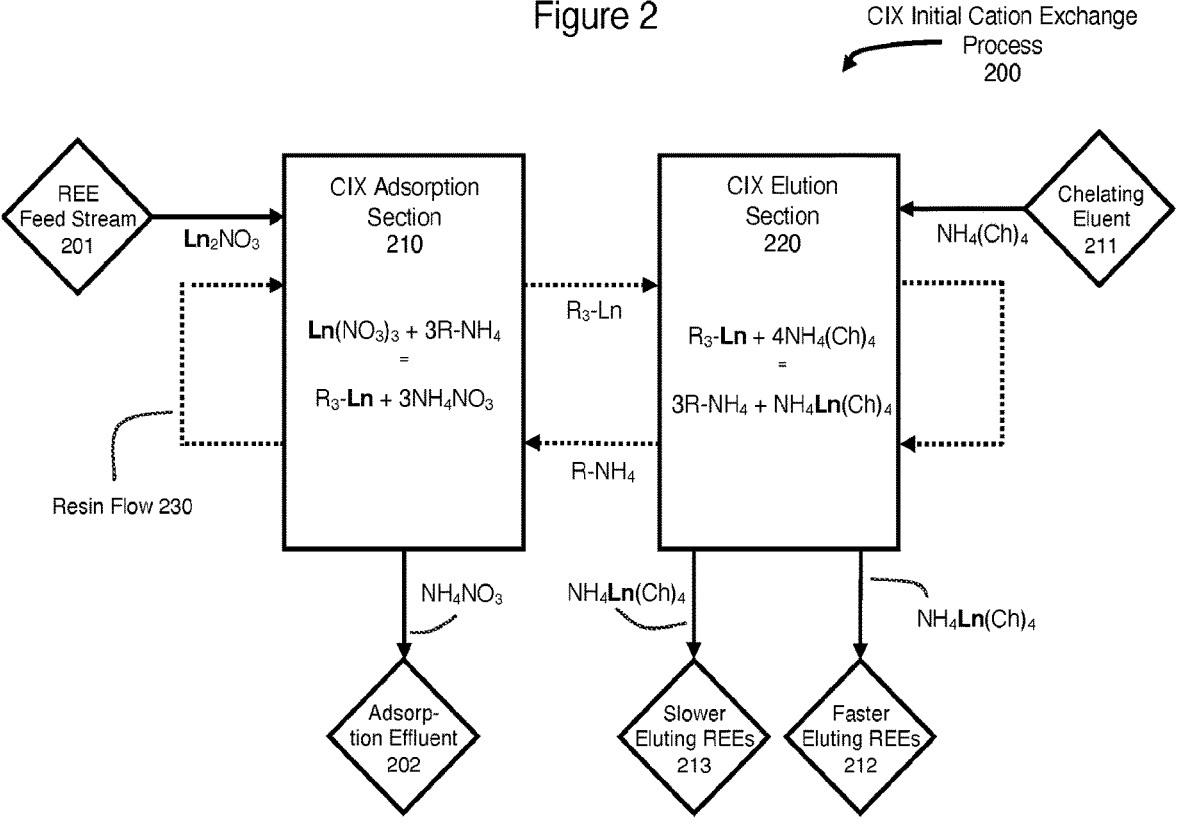
FIG. 2 is a diagram of an exemplary CIX initial cation exchange process useful in the novel refining processes disclosed herein, particularly in the first step of such refining processes.

FIG. 2 depicts an exemplary CIX initial cation exchange process (200), which may be used to implement CIX initial cation exchange process (112) shown in FIG. 1. The initial cation exchange process (200) is implemented on a CIX device comprising an adsorption section (210) and an elution section (220). Inputs to initial cation exchange process (200) include REE feed stream (201) and chelating eluent (211). The REE feed stream (201) to initial cation exchange process (200) may take the form of REE feed stream (101), shown in FIG. 1 and discussed in connection therewith. Likewise, chelating eluent (211) may have been prepared by preparation process (130), also shown in FIG. 1 and described above in connection therewith.

The pre-processed inputs produced by initial cation exchange process (200) include a stream containing faster eluting REEs (212) and a stream of slower eluting REEs (213), in this example, as separate streams of ammonium salts in solution. The initial cation exchange process (200) leverages the fact that REEs elute at different rates depending on their atomic weight. Table 1 shows a typical order for elution from a strong acid cation ion exchange resin:

TABLE 1

| Name | Symbol | Atomic No. | Group |
|---|---|---|---|
| Lutetium | (Lu) | 71 | Heavies |
| Ytterbium | (Yb) | 70 | Heavies |
| Thulium | (Tm) | 69 | Heavies |
| Erbium | (Er) | 68 | Heavies |
| Holmium | (Ho) | 67 | Heavies |
| Terbium | (Tb) | 66 | Mids |
| Dysprosium | (Dy) | 65 | Mids |
| Gadolinium | (Gd) | 64 | Mids |
| Europium | (Eu) | 63 | Lights |
| Samarium | (Sm) | 62 | Lights |
| Neodymium | (Nd) | 60 | Lights |
| Praseodymium | (Pr) | 59 | Lights |
| Cerium | (Ce) | 58 | Lights |
| Lanthanum | (La) | 57 | Lights |

Table 1 shows the REEs divided into three groups, "light," "middle," and "heavy," though other groupings are possible. The one or more pre-processed inputs (212, 213) produced by initial cation exchange process (200) respectively containing faster and slower eluting REEs are individually provided to CIX binary separation process (114), as shown for example in FIG. 1. The CIX binary separation process (114) is discussed in greater detail in FIGS. 3 & 4.

The pre-processed inputs (212, 213) may be produced as follows using CIX initial cation exchange process (200). Suitable commercially available resins include strongly acidic cation resins (SACs), such as Dowex 50W-X8 or Purolite Shallow Shell Technology (SST). Preferably, the resin has uniform particle size (UPS) with a mean diameter between 75-420 microns. A mixture of REEs (Ln) from a purified feed solution, e.g., REE feed stream (201), may be adsorbed onto a suitable cation resin within CIX adsorption section (210), as described below in Reaction No. 1:

$$\underset{\text{Resin}}{3\text{R-NH}_4} + \underset{\text{Solution}}{\text{Ln(NO}_3)_3} = \underset{\text{Resin}}{\text{R}_3\text{-Ln}} + \underset{\text{Solution}}{3\text{NH}_4\text{NO}_3} \qquad \text{(Reaction No. 1)}$$

Ln is used generally to indicate any REE. The REEs adsorbed onto the cation resin are then desorbed/eluted in a CIX elution section (220) employing a salt of a chelating anion (Ch) (211), as described below in Reaction No. 2:

$$\underset{\text{Resin}}{\text{R}_3\text{-Ln}} + \underset{\text{Eluent}}{4\text{NH}_4(\text{Ch})} = \qquad \text{(Reaction No. 2)}$$

$$\underset{\text{Resin}}{3\text{R-NH}_4} + \underset{\text{Eluate (Chelated Ln Solution)}}{\text{NH}_4\text{Ln(Ch)}_4}$$

This initial ion exchange produces one or more pre-processed feed solutions (212 & 213) containing the REEs in the form of an ammonium salt of an anionic complex, $\text{NH}_4\text{Ln(Ch)}_4$, as shown on the righthand side of Reaction No. 2. The effluent (202) from the adsorption section (210) of initial cation exchange process (200) consists of $\text{NO}_3$ and $\text{NH}_4$, per Reaction No. 1, which can produce a saleable fertilizer product. The use of a lanthanide nitrate feed solution in the examples discussed herein does not exclude substituting nitrate for other mineral acid anions, e.g., sulphate or chloride.

As mentioned, in the CIX elution section (220) of the initial cation exchange process (200), the one or more liquid eluates (212, 213) provide the feed solution for the second step in the process. Specifically, one or more streams of pre-processed REE solution (e.g., ammonium salt solution of complexed REEs) are provided to the CIX binary separation process (FIG. 1, 114, shown in more detail at FIG. 3, 300), or Step 2, of the refining process (100). Step 2 consists of multiple CIX devices each configured to split the REE mixture into two separate streams and may therefore be referred to as "Binary Separators." A single instance of a binary separation unit (300) is depicted in FIG. 3.

The pre-processed inputs, from Step 1, are provided to one or more CIX devices for separation processing, in Step 2. Water, acid, and chelating eluent are also delivered to the refinery for use in the binary separators (see, e.g., FIG. 1). Water is used to rinse the acidified resin in the CIX devices and recover entrained chelating eluent from the resin beds as they progress through the cyclic process steps within binary separators. Acid is used to recondition the resin. The chelating eluent is typically an ammonium salt of an organic acid anion. Using water, acid, and chelating eluent, a single binary separator, implemented on a single CIX device, produces an extract stream (331) and a raffinate stream (332). The extract stream includes lighter (slower eluting) REEs while the raffinate stream includes heavier (faster eluting) REEs. Effluent (334) produced by a binary separator is a byproduct, saleable as a liquid fertilizer. The extracts and raffinates may be provided to additional binary separator units, each implementing the same process outlined above, to produce further extract and raffinate streams, until the desired extent of isolation is achieved, including but not limited to substantially one REE in solution per stream.

Figure 3:
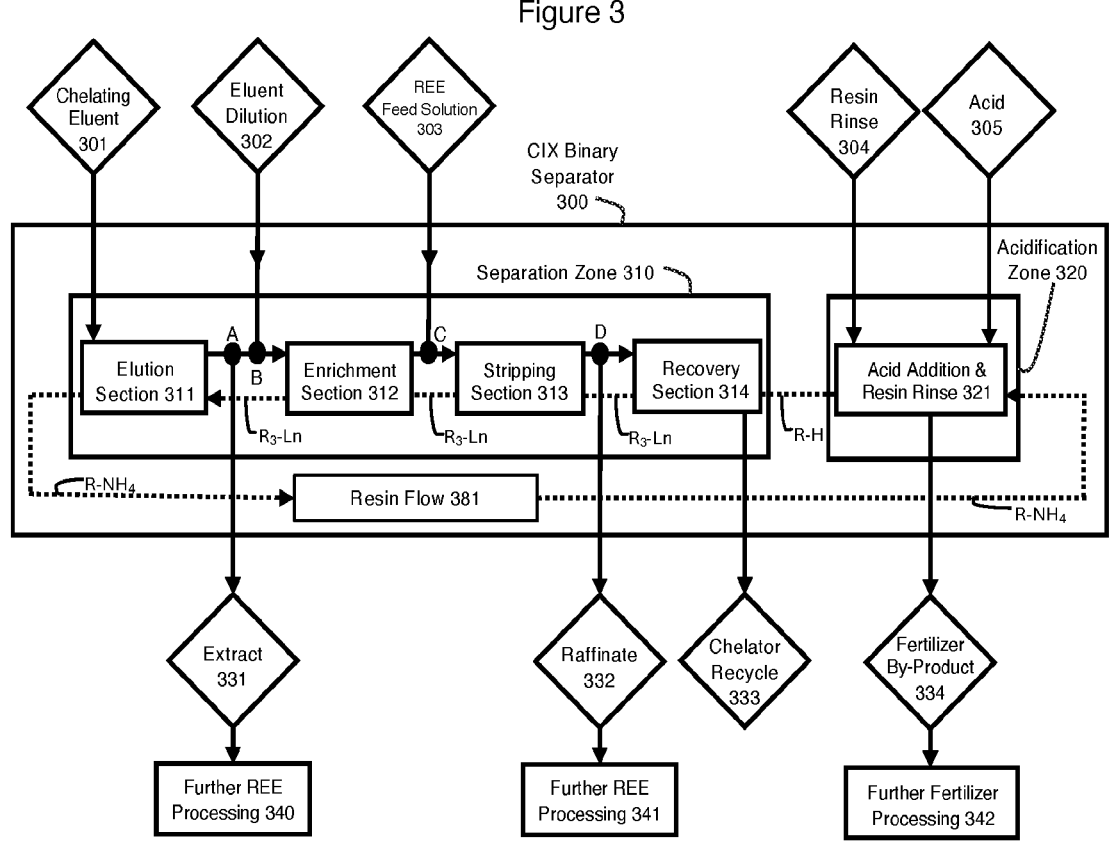
FIG. 3 is a diagram of an exemplary single instance of a CIX binary separation process useful in the novel refining processes disclosed herein, particularly in the second step of such refining processes.

FIG. 3 is a diagram showing a single instance of a continuous ion exchange process for separating a group of rare earth metals. An exemplary binary separation process within a single binary separator, such as binary separator (FIG. 4, B-1), is shown in FIG. 3. This CIX process is implemented on a CIX device consisting of 10-40 columns of small, fixed ion exchange beds. Each column contains the same type of, and volume of, ion exchange resin. The columns are arranged into various zones of ion exchange operation. All columns cycle through all operations, and all operations take place simultaneously and are continuously in operation. Each binary separation consists of using groups of the resin columns then-assigned to the separation of REEs to separate the REE feed stream into two product streams, namely, an extract steam (331) and a raffinate stream (332). As shown in FIG. 3, the resin flows (381) from right to left. The feed solution (303) is in either the form of a pre-processed input (e.g., 212, 213) produced by CIX initial cation exchange process (200), as described above, or as one of the outputs of a prior CIX binary separation process (e.g., the extract or raffinate flow (e.g., 331, 332) produced by another instance of CIX binary separation process). The feed solution (303) enters the process as Junction C, and passes countercurrent to the resin, from left to right.

A single instance of the CIX binary separator (300) consists of two main zones: a) a Separation zone (310) and b) an Acidification zone (320). The resin flows (381) through both zones and recycles continuously; the previously mentioned CIX devices implement the resin flow. The Separation zone (310) is dedicated to splitting the incoming REE feed stream (303) into two product streams, viz., extract (331) and raffinate (332) streams. The Separation zone comprises several sub-zones or sections, viz., the Elution (311), Enrichment (312), Stripping (313), and Recovery (314) sections. The numbers of individual resin columns allocated to each section is a flexible part of the design process.

The primary function of the Acidification zone (320) is to reacidify the resin after it exits the Separation zone (310) of the CIX binary separator (300); this is sometimes referred to as re-conditioning the resin. The Acidification zone can therefore be thought of as performing certain housekeeping tasks in the separation processes disclosed herein. The refinery CIX operations disclosed herein produce acidic effluent streams (141). This results from the overall requirement to re-acidify the resins as they pass through the entire cycle. During the cyclic process, the resin acidification steps are executed outside of the sections in which the mixed REEs are separated.

The primary input to the Acidification zone (320) is the resin flow from the Elution section (311) of the Separation zone (310). Additional inputs to the Acidification zone include resin rinse (304) in the form of water as well as acid (305). As shown in FIG. 3, the resin (381) enters the Acidification zone (320) from the Separation zone (310), more particularly, from the Elution section (311) of the Separation zone (310), in R—NH$_4$ form. An initial housekeeping task is performed using water to displace entrained eluent.

Reconditioning of the resin (321) in the Acidification zone (320) can be characterized by example with Reaction No. 3:

$$
\begin{array}{cc}
\text{R-NH}_4 & \text{HNO}_3 \\
\text{Resin} & + \text{ Acid Eluent} = \\
\text{from Elution} & \text{Acidification}
\end{array}
\qquad \text{(Reaction No. 3)}
$$

$$
\begin{array}{cc}
\text{R-H} & \text{NH}_4\text{NO}_3 \\
\text{Resin} & + \quad \text{Eluate} \\
\text{into Recovery} & \text{to Fertilizer by-product}
\end{array}
$$

As shown, the Acidification zone (320) uses a mineral acid (305), e.g., HNO$_3$, to convert the resin (381) from R—NH$_4$ to R—H form. In the example of Reaction No. 3, nitric acid is used to reacidify the resin, although other acids could be used, such as hydrochloric acid, HCl, or sulfuric acid, H$_2$SO$_4$. The acidified resin is then rinsed with water (321). Note that, in the preferred utilization of this process, the main fluid effluent (334) from the Acidification zone (320) will be a solution of ammonium nitrate (AN), which can be processed further (342) to remove any contaminating cations and is a useful fertilizer by-product. As such, outputs of the Acidification zone include a byproduct (334), e.g., NH$_4$NO$_3$, which is saleable as a liquid fertilizer product, as well as an outlet flow of recovered eluent which passes to a chelator recycling plant, to produce recycled chelating eluent for reintroduction into the CIX process, as fresh eluent (301).

Acidified resin (R—H), which has been washed (321) in the Acidification zone (320) then enters the Recovery section (314) of the Separation zone (310)—in which excess raffinate REEs are captured on the resin in R—H form; the resin state consequently switches to the R$_3$-Ln form. The function of the Recovery section (314) can be characterized by Reaction No. 4:

$$
\begin{array}{cc}
\text{3R-H} & \text{NH}_4.\text{Ln[H](Ch)}_4 \\
\text{Acidified Resin} & + \text{ Solution (Raffinate)} =
\end{array}
\qquad \text{(Reaction No. 4)}
$$

$$
\begin{array}{cc}
\text{R}_3\text{Ln[H]} & 3\text{HCh} + \text{NH}_4.\text{Ch} \\
\text{Resin} & + \text{ Chelator Recycle (Eluent Make-Up)}
\end{array}
$$

As shown (Reaction No. 4), acidified resin, 3R—H, re-loads with heavy (faster eluting) lanthanides, Ln[H], to form R$_3$-Ln[H]. Stated otherwise, this reaction uses the solution of the complexed REE ammonium salt, NH$_4$·Ln[H](Ch)$_4$, to convert the acidified resin, R—H, into REE loaded resin, R$_3$-Ln[H]. This operation (Reaction No. 4) acts as a trap (so to speak) to keep all REEs inside the Separation zone, at the Recovery (314) end of the Separation zone; just as Reaction No. 6 (below) prevents REEs from exiting the Separation zone at the Elution (311) end thereof. Reaction No. 4 not only acts to reload REEs onto the resin phase but also recovers the chelating agent into solution (333), which exits the Recovery section (314) and routed to the chelator recycling process for reuse.

The resin loaded with REEs then traverses the Stripping section (313), passes a REE feed input (Junction C) that receives an inflow of feed solution (303) containing REEs complexed with the anion of a suitable organic acid, e.g., NH$_4$Ln(Ch)$_4$, as explained in connection with FIG. 2. Alternatively, feed solution (303) may be the extract or raffinate flows from another instance of a binary separator. Resin then moves through the Enrichment section (312), as shown in FIG. 3. The resin traverses the Stripping and Enrichment sections (312, 313) and remains in the R$_3$-Ln form.

Fluid flow across Enrichment section (312) to the feed point (Junction C) is in the reverse direction to the resin flow (381). The outlet flow of the Stripping section (313) is split, at Junction D, into a raffinate (332) flow, consisting of heavier (faster eluting) REEs, and an excess flow into the Recovery section (314). In similar fashion, the outflow from the Elution section (311) is split, at Junction A, into an extract flow (331), and the excess flow is introduced into the Enrichment section (312).

In the Stripping and Enrichment sections (312, 313), the resin movement contacts a counter-current flow of solution containing REEs complexed with the anion (e.g., NH$_4$Ln $(Ch)_4$) of a suitable organic acid, e.g., lactic, glycolic, and other alpha hydroxy carboxylic acids. The affinity of each REE for the complexing anion varies in strength across the spectrum of the REE elements (atomic nos. 57-71, plus Sc & Y). The heavier or faster eluting REEs (e.g., higher atomic weight) prefer the solution phase, and the lighter or slower eluting REEs (i.e., lower atomic weight) prefer the resin phase. Consequently, there is a constant reflux and interchange of REE species between the solution and resin phases as they meet in countercurrent contact, which results in an enrichment of lighter rare earths, on the resin phase, moving toward the extract (331) outlet and an enrichment of heavier rare earths, in the solution phase, moving toward the raffinate (332) outlet. The function of the Stripping and Enrichment sections (312, 313) can be characterized by Reaction No. 5:

$$\underset{\text{Resin ex-Recovery}}{R_3\text{-Ln[H]}} + \underset{\text{Strip/Enrich Soln}}{NH_4.Ln[L](Ch)_4} = \qquad \text{(Reaction No. 5)}$$

$$\underset{\text{Resin into-Elution}}{R_3\text{-Ln[L]}} + \underset{\text{Soln into Raffinate}}{NH_4.Ln[H](Ch)}$$

$$H = \text{Heavier REE and } L = \text{Lighter REE}$$

In the example of Reaction No. 5, solution that contains "light" REEs, $NH_4 \cdot Ln[L](Ch)_4$, contacts resin sites containing "heavier" REEs, $R_3$-Ln(H), and an exchange occurs based on the thermodynamic driving force associated with differences in complexing strengths of the two REE species. Consequently, the heavier REEs flow with the solution countercurrent to the resin movement and exit the Stripping section (313) via a raffinate (332) outlet positioned at or about the junction (D) of the Stripping section (313) with the Recovery section (314). The lighter REEs by contrast, preferentially loading onto the resin phase, move with the resin, in the opposite direction to the heavier REEs and enter the Elution section (311) of the Separation zone (310).

In the Elution section (311), fresh chelating agent is used to remove light REEs from resin into an extract outflow (331). Specifically, a chelating eluent (301) is introduced at the entrance of the Elution section (311) of the Separation zone (310). This function can be characterized by Reaction No. 6:

$$\underset{\text{Resin ex Enrichment}}{R_3\text{-Ln[L]}} + \underset{\text{Fresh Eluent}}{4NH_4.(Ch)} = \qquad \text{(Reaction No. 6)}$$

$$\underset{\text{Resin}}{3R\text{-NH}_4} + \underset{\text{Eluted Extract}}{NH_4.Ln[L](Ch)_4}$$

As shown in Reaction No. 6, within the Elution section (311), an extract stream (331) containing lighter REEs is produced. The resin exiting the Elution section (311), now loaded with ammonium ion, $3R-NH_4$, flows out of the Separation zone (310) and into the Acidification zone (320) for reconditioning as described above in connection with Reaction No. 3. Further, the outlet solution flow from the Elution section (311) is split into an extract (331) product flow, consisting of lighter REEs, and a feed into the Enrichment section (312).

As noted above, there is a constant flow of solution from the addition of Eluent (301) through the Elution section (311). Elution section is divided at Junction "A" into Extract (331) and a flow into the Enrichment (312) section. In some cases, an addition of dilution water (Junction "B") is made here. This pattern then repeats itself as the solution flows counter-current to the resin movement, all the way to the final exit flow (333) out of the Recovery section (314). Junction "C" accommodates the inflow of the REE feed solution mixture. Junction "D", like junction "A", splits the Raffinate (332) and solution flow into Recovery section (314).

Figure 4:
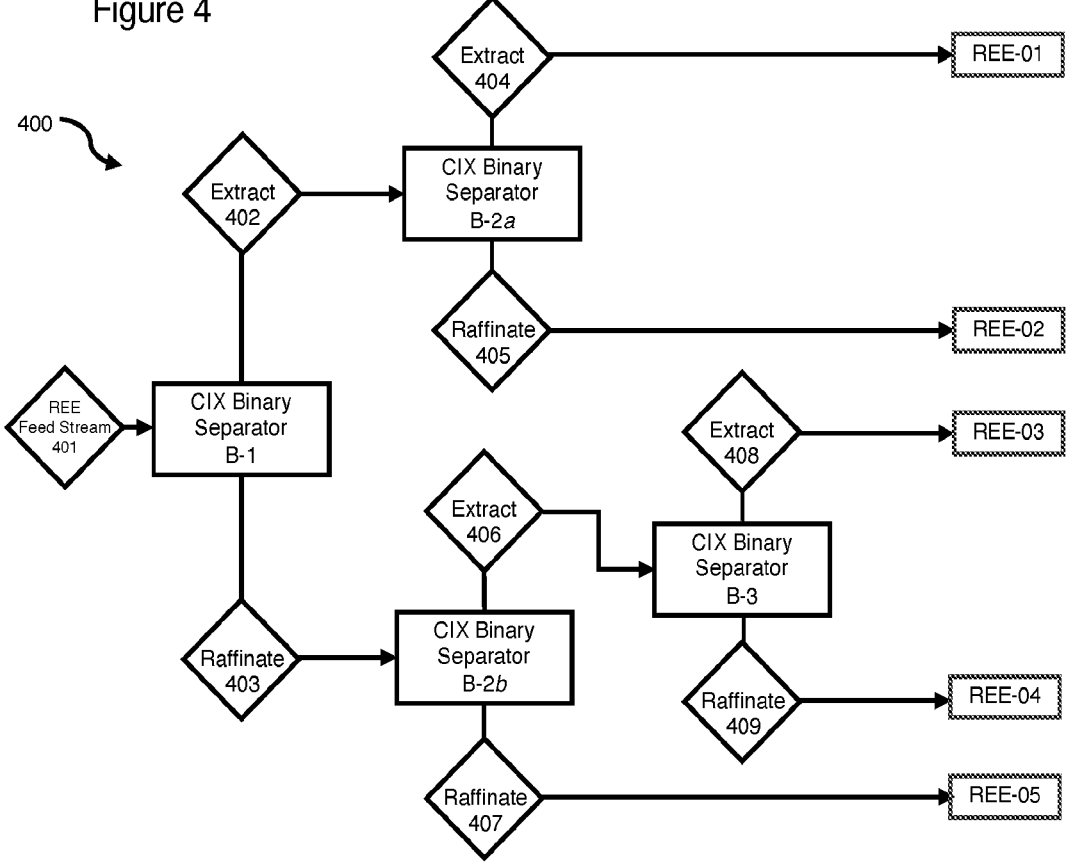
FIG. 4 is a diagram of an exemplary CIX binary separation process, particularly useful in the second step of the novel refining processes disclosed herein, for producing three or more separate streams each containing one or more, but not all, rare earth elements present in a feed stream.

FIG. 4 is a diagram of an exemplary CIX binary separation process (400) for producing three or more separate streams (REE-01, REE-02, REE-03, REE-04, REE-05), each containing one or more, but not all, rare earth elements contained in REE feed stream (401). CIX binary separation process (400) may be used to implement CIX binary separation process (114) shown in FIG. 1 as part of refining process (100). CIX binary separation process (400) receives an REE feed stream (401), which may be one of the pre-processed inputs (116) produced by CIX initial cation exchange process (112), as detailed with reference to FIG. 2. Returning to FIG. 4, a set of binary separators (B1, B2a, B2b, B-3) are provided. In the example of FIG. 4, a first binary separator (B-1) receives REE feed stream (401). Through the CIX separation process detailed in FIG. 3, the first binary separator (B-1) produces an extract stream (402) and raffinate stream (403), containing the slower-eluting and faster-eluting REEs in REE feed stream (401), respectively. Each of extract stream (402) and raffinate stream (403) is provided to another binary separator. In the example of FIG. 4, extract stream (402) is provided to binary separator (B-2a), while raffinate stream (403) is provided to binary separator (B-2b). Each of these binary separators (B-2a, B-2b) likewise implements the CIX separation process detailed in FIG. 3 to produce additional extract and raffinate streams. In particular, binary separator (B-2a) produces extract stream (404) and raffinate stream (405). In this example, no further separation of REE species is performed on the output of binary separator (B-2a), for example, because extract stream (404) and raffinate stream (405) represent either a single REE or a group of REEs (REE-02, REE-03) sufficiently isolated from other REEs to be saleable or otherwise useful. The same may be true of outputs of other binary separators, such as the raffinate stream (407) produced by binary separator (B-2b), which is REE-05. Alternatively, such outputs may be provided to additional instances of binary separators to continue the separation process. For instance, binary separator (B-3) may accept a stream as input, such as extract stream (406) produced by binary separator (B-2b), and using the binary separation process illustrated in FIG. 3, produce further separated streams, namely, extract stream (408) and raffinate stream (409) to form REE-03 and REE-04, respectively. A person of ordinary skill in the art will recognize that additional binary separators may be used to further separate streams previously produced by other binary separators without departing from the spirit and scope of the present invention. Likewise, if the initial cation exchange process (200) provides two or more pre-processed inputs (212, 213), each such pre-processed input may be provided to one or more binary separators for further separation. The separate REE streams produced by CIX binary separation process (400) may then undergo further processing and finishing, as shown in FIG. 1, to produce saleable rare earth oxides or rare earth carbonates (190). It should be noted, with reference to FIG. 4, that the eluent introduced in additional instances (e.g., downstream instances) of the continuous ion exchange process may be stronger than the eluent introduced in earlier (e.g., upstream) instances of the continuous ion exchange process.

The process descriptions here are illustrative only and are not intended to limit the scope of the invention as defined by the appended claims. It will be apparent to those skilled in the art that various modifications and variations can be made in the methods of the present invention without departing from the spirit and scope of the invention. Thus, it is intended that the present invention cover modifications and variations of this invention provided they come within the scope of the appended claims and their equivalents. Such alternatives include, instead of using $NH_4+$ as the carrier cation, sodium ($Na+$) or potassium ($K+$) cations, or other suitable soluble cations, could be used. Similarly, instead of using $NO_3$— as the acidic anion, chlorine ($Cl$—) or sulphate ($SO_4{}^{2-}$), or other suitable acidic anions, could be used. While, as explained above, preferred resins are typically SAC type (strong acid) from commercial manufacturers, other resins can be used, e.g., both SBA and WBA types (strong and weak base) can be used.

What we claim is:

1. A process for separating rare earth metals comprising:

a) receiving a purified feed solution comprising a mixture of cations of two or more rare earth metals, wherein each of the two or more rare earth metals is selected from the group consisting of the elements having atomic numbers 57-71, scandium (atomic no. 21), and yttrium (atomic no. 39), and wherein the purified feed solution is substantially free of non-rare earth elements;

b) loading the cations contained in the purified feed solution onto a first cation resin;

c) eluting the cations loaded onto the first cation resin with a first eluent to form one or more eluates of rare earth metals complexed with an anion of a chelating agent, wherein the chelating agent is a salt solution of an organic acid;

d) separately providing each of the one or more eluates as a feed input to a respective first instance of a continuous ion exchange process implemented on a continuous ion exchange device, wherein the continuous ion exchange process comprises:

i) continuously contacting the feed input over a second cation resin by passing the feed input countercurrent to the second cation resin in a series of columns, wherein the second cation resin has been acidified and rinsed;

ii) continuously producing a raffinate stream comprising cations of a first set of one or more faster-eluting rare earth metals;

iii) continuously introducing a pure chelating second eluent free of rare earth metals or cations thereof in countercurrent fashion over the second cation resin, wherein the second eluent desorbs rare earth metals present in the feed input to produce an extract stream comprising cations of a second set of one or more slower-eluting rare earth metals;

iv) continuously recovering the second cation resin for reuse in a subsequent cycle of the continuous ion exchange process, wherein said second cation resin is recycled via an acidification process; and v) and recycling a non-excess portion of the raffinate stream and a non-excess portion of the extract stream;

e) providing an excess portion of the raffinate stream produced by the first instance of the continuous ion exchange process as the feed input to a second instance of the continuous ion exchange process;

f) providing an excess portion of the extract stream produced by the first instance of the continuous ion exchange process as the feed input to a third instance of the continuous ion exchange process; and g) providing each of the excess portion of the raffinate stream and the excess portion of the extract stream produced by each of the second and third instances of the continuous ion exchange process as the feed input to respective additional instances of the continuous ion exchange process until each of the raffinate and extract streams produced by such additional instances consists essentially of cations of a single rare earth metal or cations of a third set of rare earth metals.

2. The process of claim 1, wherein the first cation resin is present in a continuous ion exchange device.

3. The process of claim 1, wherein the acidification process comprises introducing an aqueous acid stream to contact the recovered second cation resin in countercurrent fashion.

4. The process of claim 3, wherein the aqueous acid stream comprises nitric acid.

5. The process of claim 4, wherein the aqueous acid stream comprises 15-20% nitric acid.

6. The process of claim 4, wherein the acidification process produces a liquid ammonium salt by-product stream.

7. The process of claim 1, wherein the organic acid is an α-hydroxy carboxylic acid.

8. The process of claim 1, wherein the second eluent introduced in the additional instances of the continuous ion exchange process is stronger than the second eluent introduced in the first, second, and third instances of the continuous ion exchange process.

9. The process of claim 1, wherein producing the extract stream is characterized by $R_3$-$Ln[L]+4NH_4Ch=3R$—$NH_4+NH_4{\cdot}Ln[L](Ch)_4$, wherein R refers to the second cation resin, wherein Ln[L] refers to a light rare earth element, and wherein Ch refers to the anion of the chelating agent.

10. The process of claim 1, wherein producing the raffinate stream is characterized by $R_3$-$Ln[H]+NH_4{\cdot}Ln[L](Ch)_4=R_3$-$Ln[L]+NH_4{\cdot}Ln[H](Ch)_4$, wherein R refers to the second cation resin, wherein Ln[L] refers to a light rare earth element, wherein Ln[H] refers to a heavy rare earth element, and wherein Ch refers to the anion of the chelating agent.

11. The process of claim 1, further comprising introducing the excess portion of the raffinate stream into a recovery section in countercurrent fashion with the second cation resin and producing an effluent stream comprising a chelating acid and its ammonium salt.

12. The process of claim 11, wherein producing the effluent stream is characterized by $3R$—$H+NH_4{\cdot}Ln[H](Ch)_4=R_3$-$Ln[H]+NH_4Ch+3HCh$, wherein R refers to the second cation resin, wherein Ln[H] refers to a heavy rare earth element, and wherein Ch refers to the anion of the chelating agent.

13. The process of claim 1, further comprising the steps of precipitating, filtering, and drying the single rare earth metal or the third set of rare earth metals.

14. The process of claim 13, wherein the step of precipitating employs a precipitant selected from the group consisting of oxalic acid, ammonium carbonate, and ammonium bicarbonate.

15. The process of claim 1, wherein particles in the first and second cation resins have uniform mean particle size.

16. The process of claim 15, wherein the particles in the first and second cation resins have a mean particle diameter between 75-420 microns.

17. The process of claim 1, wherein a pH of the first and second eluents is within a range of 3.5 to 5.5.

18. The process of claim 1, wherein a concentration of the first and second eluents ranges of 0.1 Molar to 0.6 Molar.

19. The process of claim 1, wherein a temperature of the first and second eluents is within a range of 15-90° C.

\* \* \* \* \*